US00RE41206E

(19) United States
(12) Reissued Patent
Gwiazdowski et al.

(10) Patent Number: US RE41,206 E
(45) Date of Reissued Patent: Apr. 6, 2010

(54) CONNECTING CABLE COMPRISING AN ELECTRIC PLUG-AND-SOCKET CONNECTION

(75) Inventors: Michael Gwiazdowski, Berlin (DE); Frank Mossner, Berlin (DE)

(73) Assignee: ADC GmbH, Berlin (DE)

(21) Appl. No.: 11/525,191

(22) PCT Filed: Nov. 16, 2000

(86) PCT No.: PCT/EP00/11348

§ 371 (c)(1),
(2), (4) Date: Jun. 6, 2002

(87) PCT Pub. No.: WO01/43239

PCT Pub. Date: Jun. 14, 2001

Related U.S. Patent Documents

Reissue of:
(64) Patent No.: 6,793,515
Issued: Sep. 21, 2004
Appl. No.: 10/149,280
Filed: Jun. 6, 2002

(30) Foreign Application Priority Data

Dec. 10, 1999 (DE) ..... 199 59 823

(51) Int. Cl.
*H01R 13/625* (2006.01)

(52) U.S. Cl. ..... 439/344; 439/502; 439/941
(58) Field of Classification Search ..... 439/344, 439/502, 941, 418, 676, 460
See application file for complete search history.

(56) References Cited

U.S. PATENT DOCUMENTS

| | | | | |
|---|---|---|---|---|
| 5,655,284 | A | | 8/1997 | Ferrill et al. |
| 5,888,100 | A | | 3/1999 | Bofill et al. |
| 5,944,535 | A | * | 8/1999 | Bullivant et al. ..... 439/49 |
| 5,989,071 | A | | 11/1999 | Larsen et al. |

(Continued)

FOREIGN PATENT DOCUMENTS

| | | |
|---|---|---|
| DE | 196 49 668 C1 | 5/1998 |
| EP | 1 017 498 A2 | 6/2000 |
| JP | 10302852 | 11/1998 |
| WO | WO 95/08134 | 3/1995 |
| WO | WO 96/13878 | 5/1996 |
| WO | WO 99/17406 | 4/1999 |

OTHER PUBLICATIONS

CobiNet, Apr. 1998, CobiNet Produktkatalog '98, CobiNet.

*Primary Examiner*—Ross N Gushi
(74) *Attorney, Agent, or Firm*—Merchant & Gould P.C.

(57) ABSTRACT

The invention relates to a connecting cable (10) comprising a cable (10) with four conductor pairs (1, 2; 3, 6; 4, 5; 7, 8) which are routed in pairs in a defined manner in the cable (10), with an identical electrical plug connection being arranged at both ends of the cable (10), with a cable manager (11, 17) having guides (21–28; 31–38) for the conductors (1–8) being arranged at each of the two cable ends for fixing and defined guidance, in which guides the conductors (1–8) of the cable (10) are routed to the electrical contacts (41–48), with the cable managers (11, 17) each having a top face (16), a bottom face (15, 19), a rear face (12, 20) and an end surface (13, 18), and with the guides (21, 22, 27, 28; 31, 32, 37, 38) of the conductors (1, 2, 7, 8) which are associated with the two outer contact pairs (41, 42, 47, 48) being formed on the sides of the cable managers (11, 17) at right angles to the end surfaces (13, 18) of the cable managers (11, 17), and, from the rear face (12) to the end surface (13) in the first cable manager (11), a first inner conductor pair (3, 6) is routed from the top face (16) and a second inner conductor pair (4, 5) is routed from the bottom face (15) into a connecting plane, without crossing, and, from the rear face (20) to the end surface (18) in the second cable manager (17), the first inner conductor pair (3, 6) is routed from the bottom face (19) and the second inner conductor pair (4, 5) is routed from the top face (16) into the connecting plane, without crossing.

38 Claims, 5 Drawing Sheets

U.S. PATENT DOCUMENTS 5,991,140 A * 11/1999 Hughes et al. ..... 361/119
6,238,235 B1 * 5/2001 Shavit et al. ..... 439/418
6,250,949 B1 6/2001 Lin
6,365,835 B1 * 4/2002 Farmer ..... 174/112
6,402,559 B1 * 6/2002 Marowsky et al. ..... 439/676
6,431,904 B1 * 8/2002 Berelsman ..... 439/447
6,517,377 B2 * 2/2003 Vaden ..... 439/502
6,524,128 B2 * 2/2003 Marowsky et al. ..... 439/418

* cited by examiner

CONNECTING CABLE COMPRISING AN ELECTRIC PLUG-AND-SOCKET CONNECTION

Matter enclosed in heavy brackets [ ] appears in the original patent but forms no part of this reissue specification; matter printed in italics indicates the additions made by reissue.

The invention relates to a connecting cable comprising a cable with a large number of conductors, which are routed in pairs in a defined manner in the cable, with an identical electrical plug connection being arranged at both ends of the cable, with a cable manager being arranged at each of the two cable ends for fixing and defined guidance, in which cable managers the conductors of the cable are routed to the electrical contacts.

The most widely used electrical plug connection for symmetrical data cables is the RJ-45 plug connection (Regular Jack 45), various versions of which are known depending on the technical requirement. For extremely high data transmission rates, compensation measures are required in the socket to reduce the overall crosstalk to the necessary extent. However, this requires tight tolerances for the crosstalk in the connector. In order to provide compatibility with components from other manufacturers, the crosstalk in the connector must be defined within a narrow tolerance band for each combination of pairs.

The crosstalk in RJ-45 connectors can be defined by the physical configuration of the parallel-arranged contacts and of the parallel routing of the conductors. At the junction to a cable, the crosstalk between the conductor pairs is subject to very wide tolerances in this area, depending on where the twisting of the conductor pairs starts and the extent to which conductors in adjacent pairs touch. The required crosstalk levels cannot be guaranteed in this simple way.

Compliance with the required crosstalk levels in a connector requires that the conductors be fixed in a defined manner in the area where the conductor pairs are routed without being twisted and changes in the position invariably result in changes in the crosstalk between the conductor pairs. This fixing of the conductors is carried out by means of a cable manager.

Such a cable manager is disclosed, for example, in EP 0 789 939 B1. This has guides on the bottom face and on top face, in which the conductor pairs are routed in a defined manner. The conductors are in this case round within the cable manager essentially at right angles to the end surface of said cable manager, with the conductors being routed behind the cable manager into a common connecting plane, where they are then connected to the contacts. In this case, the two outer conductor pairs are routed at the sides on the bottom face and top face of the opposite ends while, in contrast, the two inner conductor pairs for the interleaved contacts are routed virtually one above the other on the top face and bottom face. However, if two identical electrical plug connections, for example for a patch cable or connector cable are now intended to be connected to the two cable ends, then this leads to two conductor pairs having to be crossed over at one end of the cable, which leads to undesirable crosstalk, so that the predetermined narrow tolerance bands can no longer be complied with.

Such a patch cable or connector cable is known from the 1998 Telecommunications and Data Components of the Product Catalogue from CobiNet GmbH, April 1998, page 2.3. The prospectus does not indicate the internal design or whether a cable manager is used, and how this is constructed.

The invention is thus based on the technical problem of providing a connecting cable of this generic type, in which the tolerances in the crosstalk levels at both ends of the cable are minimized. A further technical problem is to provide a cable manager for this purpose.

The technical problem is solved by the subject matters of the features of patent claims 1, and 9. Further advantageous refinements of the invention result from the dependent claims.

To this end, from the rear face to the end surface in the first cable manager, a first inner conductor pair is routed from the top face, and a second inner conductor is routed from the bottom face of the cable manager into a connecting plane, without crossing and, from the rear face to the end surface in the second cable manager, the first inner conductor pair is routed from the bottom face, and the second inner conductor pair is routed from the top face, into a connecting plane without crossing. Use is in this case made of the fact that, by virtue of the twisting, two conductor pairs can in each case be routed on the same side on both sides of the cable, while the two other conductor pairs interchange their sides. Either the two outer pairs or the two inner pairs can thus be routed in the same way at the two electrical plug connections. Since the two outer conductor pairs would have to be interchanged over the full width of the cable manager, the two inner conductors pairs are in each case routed such that they are interchanged at the two cable managers. In consequence, the two inner conductor pairs can be routed into their connecting plane at both ends in a well-defined manner, without crossing over.

In one preferred embodiment, the two inner conductor pairs lie in the same connecting plane E1. In consequence, the two inner conductor pairs lie close to one another and produce crosstalk which is required for compatibility purposes. Since the crosstalk is produced in the connecting plane, it does not need to be produced by the conductor pairs having a specific course with respect to one another in the cable manager, so that the longitudinal dimensions of the cable manager can be kept very small and compact.

In a further preferred embodiment, the connecting plane of the inner conductor pairs lies on the top face of the cable manager, so that one conductor pair is in each case looped virtually straight through the cable manager at each end. This reduces the mechanical requirements for the cable managers since only one pair of conductors need change plane in each case.

The routing of the inner conductor pairs, or the one inner conductor pair, in the cable manager, is designed to be diagonal or vertically angled, in order to change the connecting plane. The advantage of diagonal routing is its simple implementation, since only continuous routing is required while, in contrast, the advantage of vertical angling is that the two inner conductor pairs can be routed at a greater distance from one another in the cable manager, so that the crosstalk is reduced.

In the case of interleaved contact arrangements such as the RJ-45 plug connection, the first inner conductor pair is routed in a V-shape or U-shape with respect to one another in the cable manager.

In a further preferred embodiment, the cable managers are equipped with latching means, so that the cable managers can be latched into the electrical plug connection.

The cable manager according to the invention comprises a non-conducting base body, which is constructed with guides for conductors, in which case the guides for the two outer conductor pairs are constructed essentially at right angles to one end surface at the side in the cable manager, and, from the rear face to the end surface of the cable manager, a first and a second inner pair are in each case routed in pairs from the top face and the bottom face within the cable manager into a common connecting plane E1. in the end surface. The cable manager thus allows the plane of the conductor pairs to be changed from the rear face to the end surface without crossing. Since the changing of the two inner conductor pairs at the two cable ends must actually be reversed, the cable manager must either alternatively allow both guides, or else two cable managers of different design must be used for the two cable ends. In the case of contact arrangements which are not interleaved, the guides may be constructed identically, so that there is no problem in using an identical cable manager, for both cable ends. In the case of interleaved contact arrangements, on the other hand, the two guides for the conductors differ. In this case, if the same cable manager is used, the cable manager must in each case provide guides for both the first and second inner conductor pairs on the top face to the end surface and on the bottom face to the end surface. Particularly with continuous guides, this is very complex. It is thus feasible to guide the conductor pairs only in sections within the cable manager, for example on the rear face and on the end surface of the cable manager, with the two inner conductor pairs then being routed differently in between. A disadvantageous feature of the last variant is that the conductors then require a certain amount of play between the two guides on the rear face and on the end surface and thus somewhat increase the tolerances for crosstalk depending on the distance over which the conductors are routed through the two guides.

Two different cable managers are thus used in one preferred embodiment. In the first cable manager, the guide for the first inner conductor pair is routed from the top face into the connecting plane E1 in the end surface, and the guide for the second, inner conductor pair is routed from the bottom face into the common connecting plane E1. The guides in the second cable manager are constructed such that they are interchanged in a corresponding manner.

The connecting plane E1 is preferably arranged under the top face, so that the conductor pair located at the top face on the rear face can in each case be routed virtually straight through the cable manager without changing the plane. A corresponding situation arises if the connecting plane is arranged under the bottom face. The decision as to whether the connecting plane is associated with the top face or bottom face depends on the side from which the contents are intended to make contact with the conductors.

In the case of interleaved contact arrangements, the guide for the first inner conductor pair is constructed at least partially in a U-shape or V-shape.

In a further preferred embodiment, the guides from the rear face to the end surface are in the form of continuous channels, so that the conductors are routed in a defined manner over the entire length of the cable manager.

The invention will be explained in more detail in the following text with reference to a preferred exemplary embodiment. In the figures.

Figure 4:
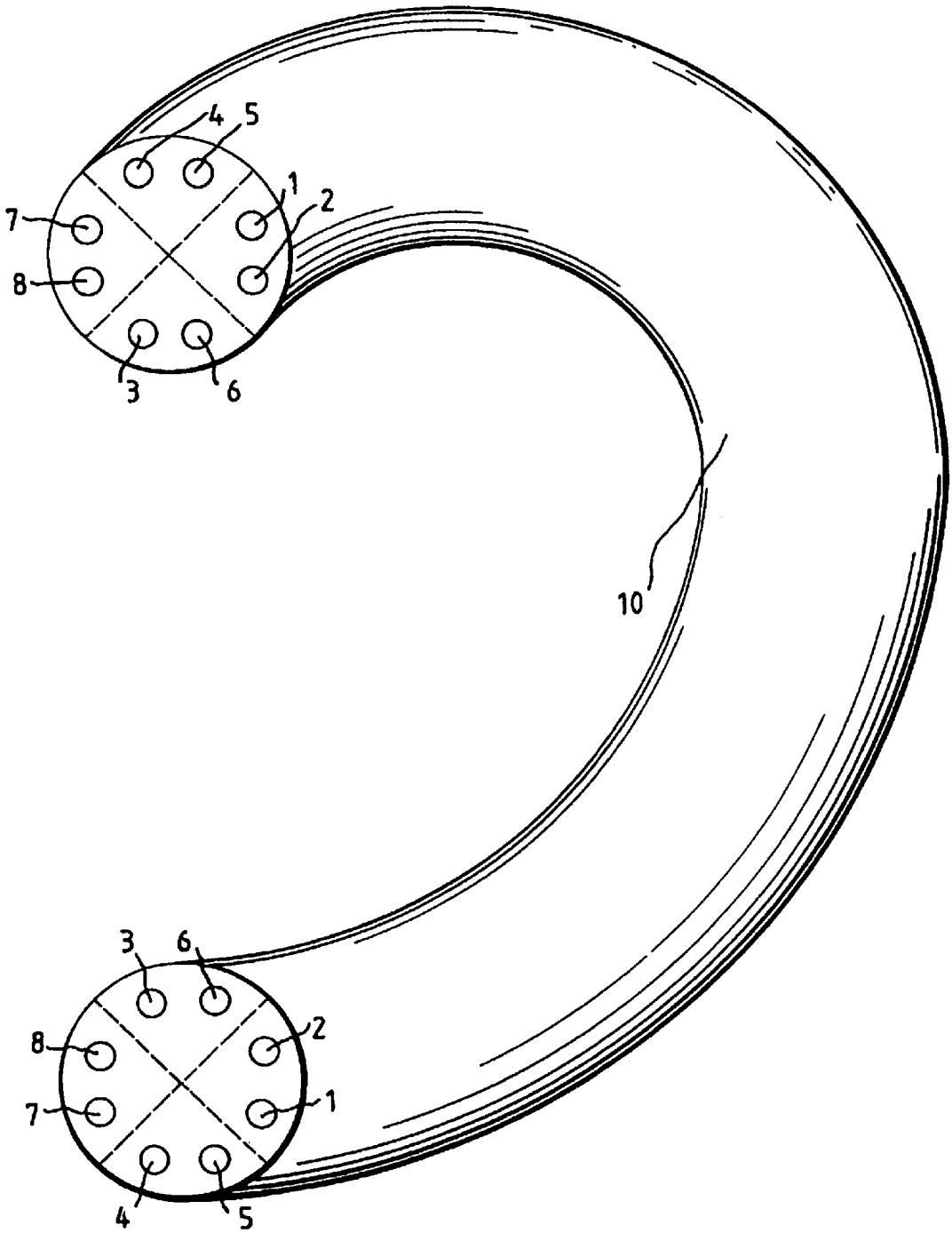
FIG. 4 is an illustration of the conductor distribution at the two end faces of an eight-core cable (prior art)
Figure 5:
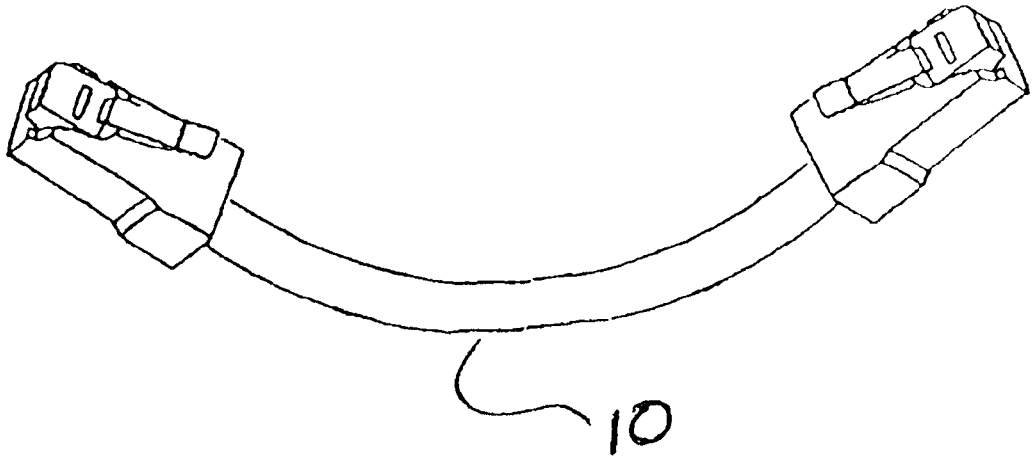
FIG. 5 is a view of identical plug connections arranged at both ends of a cable.

FIG. 4 shows an eight-core cable 10, in which the conductors 1–8 are arranged twisted in pairs in the cable 10. Depending on the configuration, the conductor pairs are also designed to be twisted with respect to one another, with spiral conductor crossings or with shields between them. Irrespective of the nature of the routing within the cable 10, this results in the conductor pair distribution as shown in FIG. 4 at both end faces. The numbering of the conductors 1–8 is in this case chosen to correspond to that in an RJ-45 connection. If the positions of the conductor pairs at the two ends of the cable 10 are compared, then it is evident that the conductor pairs 1, 2 and 7, 8 are located in the same position, while, in contrast, the two inner conductor pairs 3, 6 and 4, 5 have been interchanged. However, if it is now intended to arrange two connectors at both ends, then the conductors 3, 6 and 4, 5 would have to be crossed over at one end in order to change them back on the correct connection side for the connector.

Figure 1B:
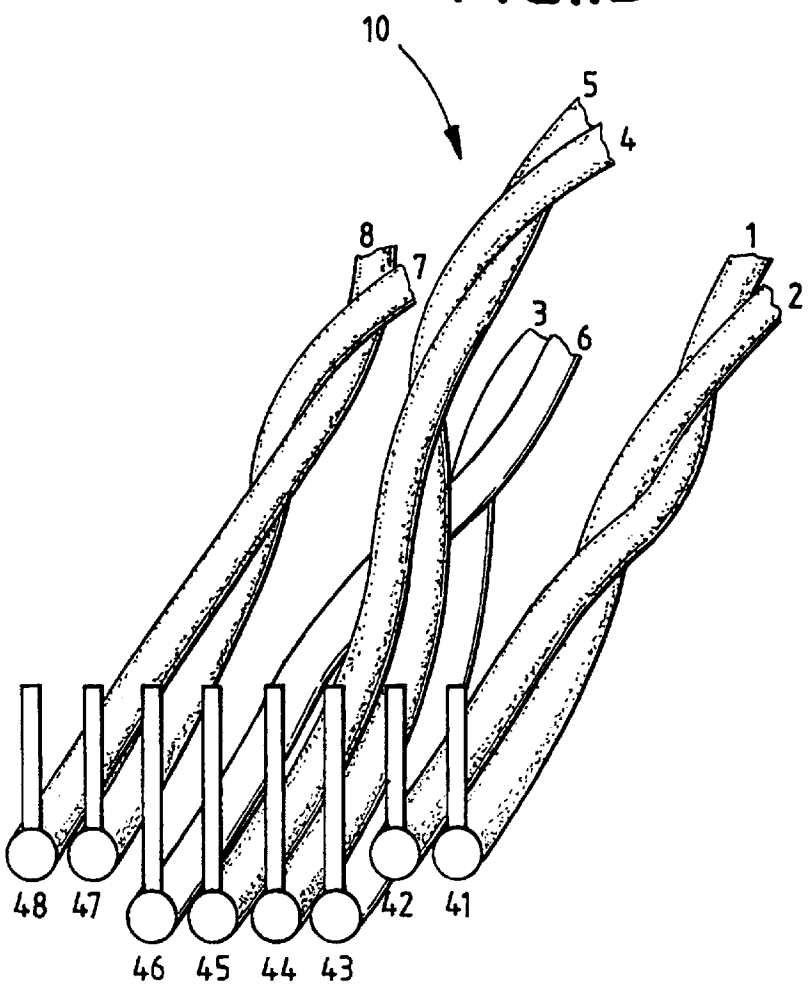
FIG. 1b is a perspective illustration of the conductor pairs at a second contact arrangement, which is opposite the first.
Figure 1A:
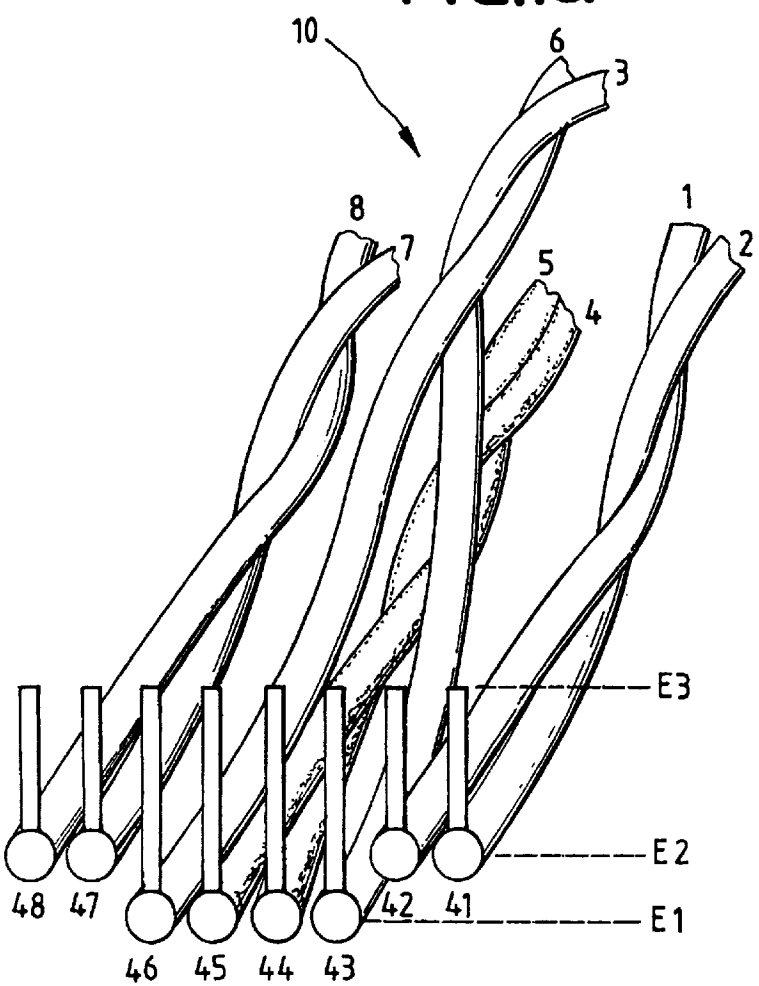
FIG. 1a is a perspective illustration of the conductor pairs at a first electrical contact arrangement.

FIGS. 1a and 1b show a perspective view of a cable 10 with the conductor pairs 1, 2; 7, 8; 3, 6; and 4, 5; being routed according to the invention at both ends, with the cable managers which provide the routing not being shown, for clarity reasons. In this case, FIG. 1a shows the front end and FIG. 1b the rear end of the cable 10 in FIG. 4. In this case, the inner conductor pairs 3, 6 are [lacuna]. Contacts 43–46 for the conductors 3–6 are arranged in a first plane E1, and contacts 41, 42, 47, 48 for the conductors 1, 2, 7, 8 are arranged in a second plane E2. The contacts 41–48 are in this case, for example, in the form of insulation-piercing contacts or insulation displacement contacts, which make electrical contact with the conductors 1–8 through their insulation. The contacts 41–48 are all routed into a single contact area plane E3. The sequence of the arrangement of the contacts 41–48 in this case corresponds to the typical RJ-45 plug connection. As can be seen from FIG. 1a, the distribution of the conductor pairs when they emerge from the one end of the cable is as follows:

Conductor pair 1, 2: right
Conductor pair 7, 8: left
Conductor pair 4, 5: bottom
Conductor pair 3, 6: top.

The conductor pairs 1, 2 and 7, 8, respectively, are routed directly out of the cable 10 to their associated contacts 41, 42 and 47, 48, respectively. The conductor pair 4, 5 can likewise be routed directly to its contacts 44, 45 while, in contrast, the conductor pair 3, 6 must be routed from above to its contacts 43, 46 into the connecting plane E1, although the conductor pair 3, 6 does not cross the conductor pair 4, 5.

However, at the opposite end, the relationship between the positions of the inner conductor pairs 4, 5 and 3, 6, respectively, are interchanged while, in contrast, the positions of the conductor pairs 1, 2 and 7, 8, respectively, have not changed. In a corresponding way, the conductor pair 4, 5 at this end must now be routed from above into the connecting plane E1, while, in contrast, the conductor pair 3, 6 can be pulled straight through. Straight through with regard to the conductor pair 3, 6 relates to its position, since the conductors 3, 6 still have to be spread at both ends owing to the interleaved arrangement of the contacts 43, 46. The conductors 4, 5 and 3, 6 do not cross over one another with this routing either.

Figure 2A:
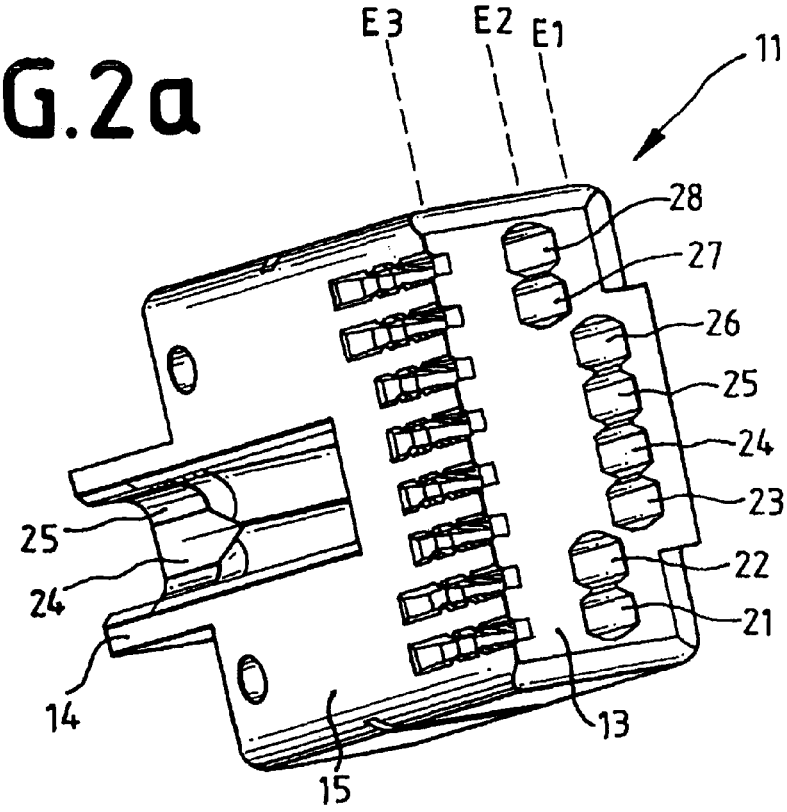
FIG. 2a is a perspective underneath view of a first cable manager.
Figure 3A:
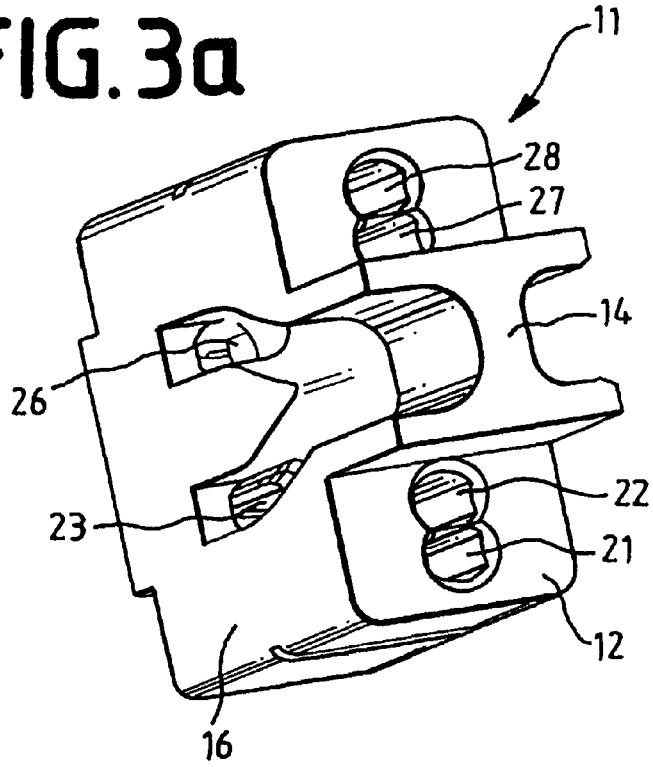
FIG. 3a is a perspective rear view of the first cable manager.

FIG. 2a shows a perspective view of the bottom face, and FIG. 3a of the rear face of a first cable manager 11. The cable manager 11 comprises a non-conductive base body, which has a guide 21–28 for each conductor 1–8. These guides 21–28 extend from the rear face 12 to the end 13 of the cable manager 11. The guides 21, 22, 27, 28 are arranged at the sides and run vertically with respect to the rear face 12 and end 13. The guides 21, 22, 27, 28 in this case all lie in a common connecting plane E2. Furthermore, the first cable manager 11 comprises an H-shaped guide element 14, which is arranged on the rear face 12 of the cable manager 11. The guides 24, 25 of the conductor pair 4, 5 start in the part of the H-shaped guide element 14 facing the bottom face 15. The guides 24, 25 run parallel to one another from the bottom face 15 into the connecting plane E1. The connecting plane E1 is located slightly below the top face 16 of the cable manager 11 at the end 13. The guides 24, 25 run either diagonally or vertically at an angle in the cable manager 11. In the case of the vertically angled embodiment, the guides 24, 25 initially run parallel in the region of the bottom face 15, and are then angled at right angles to the top face 16 up to the level of the connecting plane E1, and from there at right angles in the direction of the end 13. The guides 23, 26 start in the part of the H-shaped guide element 14 facing the top face 16. On the rear face 12, these guides 23, 26 are already located at the level of the connecting plane E1. In contrast to the guides 24, 25 which are routed parallel to one another, the guides 23, 26 run in a V-shape with respect to one another since the conductors 3, 6 to be guided have to be routed to the interleaved contacts 43, 46.

Figure 2B:
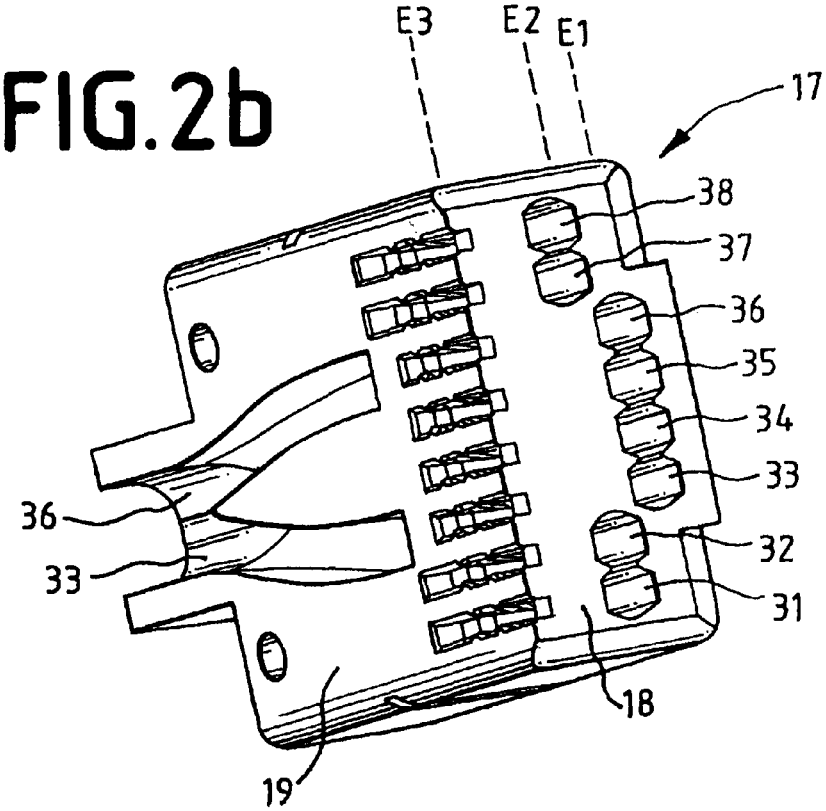
FIG. 2b is a perspective underneath view of a second cable manager.
Figure 3B:
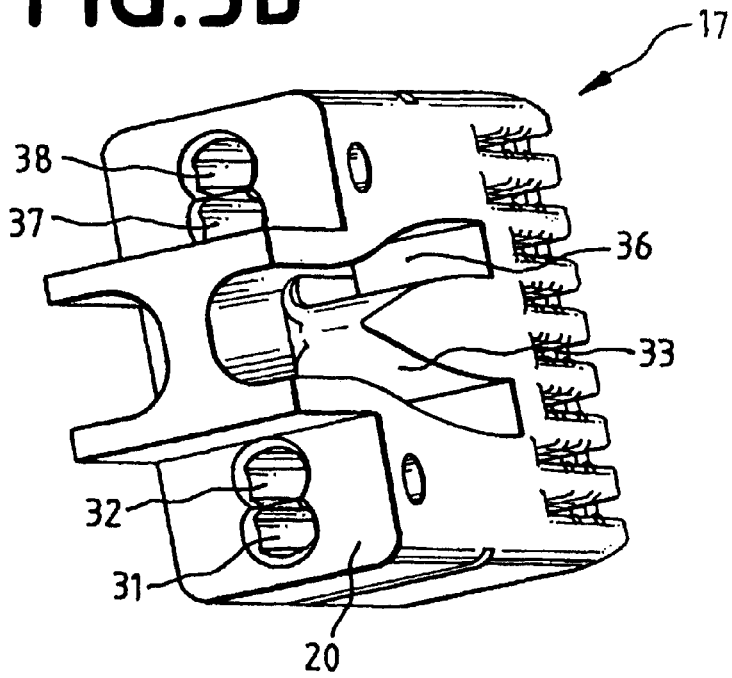
FIG. 3b is a perspective rear view of the second cable manager.

FIGS. 2b and 3b show corresponding views of a second cable manager 17. The second cable manager 17 is likewise designed with eight guides 31–38 for the conductors 1–8, with the guides 31, 32, 37, 38 being identical to the guides 21, 22, 27, 28 in the first cable manager 11. The end 18 of the second cable manager 17 is designed in the same way as the end 13 of the first cable manager 11. The contacts 11–18, which cannot be seen, are also designed and arranged in a completely identical manner. The only difference is in the guides 33, 36, 34, 35 for the conductor pairs 3, 6 and 4, 5. Since the position of the conductor pairs 3, 6 and 4, 5 has been interchanged in comparison with the first cable manager, the associated guides must likewise be interchanged in a corresponding manner. The guides 33, 36 thus run in a V-shape from the bottom face 19 into the connecting plane E1. The guides may in this case run either diagonally or vertically angled. The guides 34, 35 on the rear face 20 of the second cable manager 17 are already at the level of the connecting plane E1, and thus pass straight through at right angles to the rear face 20. The conductors 1–8 can thus be routed in a defined manner and without crossing over in two identical electrical plug connections, and the two cable managers 11, 17 need be modified only to a minimal extent with respect to one another.

List of Reference Symbols

1) Conductor
2) Conductor
3) Conductor
4) Conductor
5) Conductor
6) Conductor
7) Conductor
8) Conductor
10) Cable -continued 11) Cable manager
12) Rear face
13) End surface
14) Guide element
15) Bottom face
16) Top face
17) Cable manager
18) End surface
19) Bottom face
20) Rear face
21) Guide
22) Guide
23) Guide
24) Guide
25) Guide
26) Guide
27) Guide
28) Guide
29) Guide
30) Guide
31) Guide
32) Guide
33) Guide
34) Guide
35) Guide
36) Guide
37) Guide
38) Guide
39) Contact
40) Contact
41) Contact
42) Contact
43) Contact
44) Contact
45) Contact
46) Contact
47) Contact
48) Contact

What is claimed is:

1. A connecting cable, comprising:

a cable with four conductor pairs, the conductor pairs being routed in pairs in a defined manner in the cable;

first and second cable managers each having guides for the conductors to be arranged at each of two cable ends for fixing and defined guidance of the conductors of the cable and routing to the electrical contacts, each of the first and second cable managers having a top face, a bottom face, a rear face and an end surface with the rear face facing the cable and the end surface facing the contacts and with conductor guides associated with the two outer contact pairs being formed on the sides of the cable managers at right angles to their end surface, wherein from the rear face to the end surface in the first cable manager, a first inner conductor pair is routed from the top face, and a second inner conductor pair is routed from the bottom face into a connecting plane, without crossing, and, from the rear face to the end surface in the second cable manager, the first inner conductor pair is routed from the bottom face, and the second inner conductor pair is routed from the top face into a connecting plane without crossing.

2. The connecting cable as claimed in claim 1, wherein the guides of the second inner conductors in the first cable manager and the guides for the first inner conductors in the second cable manager are configured diagonally or vertically at an angle.

3. The connecting cable as claimed in claim 1, wherein the first inner conductor pair is associated with the outer contacts of a contact arrangement interleaved with one another, with the conductors being routed at least partially in a V-shape or U-shape within the cable managers.

4. The connecting cable as claimed in claim 1, wherein the connecting cable is in the form of a patch-cord cable.

5. The connecting cable as claimed in claim 1, wherein the first conductor pair and the second conductor pair are routed into the same connecting plane in both cable managers.

6. The connecting cable as claimed in claim 5, wherein said same connecting plane is arranged below the top face of the cable managers.

7. The connecting cable as claimed in claim 6, wherein the guides for the first inner conductors lie in the connecting plane of the first cable manager, and the guides for the second inner conductors lie in the connecting plane of the second cable manager.

8. The connecting cable as claimed in claim 1, further comprising:

identical electrical plug connections arranged at both ends of the cable.

9. The connecting cable as claimed in claim 8, wherein the cable managers are designed such that they can latch into the electrical plug connections.

10. A cable managers for prefabrication of a cable having eight conductors, the cable managers comprising:

a non-conductive base body with guides for the conductors including guides for two outer conductor pairs extending at right angles to an end surface at a side in the cable manager, said guides for said two outer conductor pairs route the two outer conductor pairs into a first common plane, and wherein the guides in a region from a rear face to the end surface of the cable manager route a first inner conductor pair and a second inner conductor pair in pairs from a top face and a bottom face within the cable manager into a second common connecting plane in the end surface, without crossing, said first and second connecting planes being spaced from each other.

11. The cable managers as claimed in claim 10, wherein the guide for the first inner conductor pair is routed from the top face into said second common connecting plane in the end surface, and the guide for the second inner conductor pair is routed from the bottom face into said second common connecting plane.

12. The cable managers as claimed in claim 10, wherein the guide for the first inner conductor pair is routed from the bottom face into said second common connecting plane in the end surface, and the guide for the second inner conductor pair is routed from the top face into said second common connecting plane.

13. The cable managers as claimed in claim 10, wherein said second common connecting plane is arranged underneath the top face, said second common connecting plane also being closer to said top face than said bottom face, said first and second common connecting planes also being substantially parallel.

14. The cable managers as claimed in claim 10, wherein the guide for the first inner conductor pair is formed at least partially in a V-shape or U-shape.

15. The cable managers as claimed in claim 10, wherein the guide which runs from the bottom face is designed such that it is bent diagonally or upwards, or at right angles to the side.

16. The cable managers as claimed in claim 10, wherein the guides are in the form of continuous channels from the rear face to the end surface.

17. A cable managers for prefabrication of a cable having eight conductors, the cable managers comprising:

a non-conductive base body with guides for the conductors including guides for two outer conductor pairs extending at right angles to an end surface at a side in the cable manager and wherein the guides in a region from a rear face to the end surface of the cable manager route a first inner conductor pair and a second inner conductor pair in pairs from a top face and a bottom face within the cable manager into a common connecting plane in the end surface, without crossing, the guide which runs from the bottom face is designed such that it is bent diagonally or upwards, or at right angles to the side.

18. A cable manager arrangement for a cable with a plurality of conductors, the cable manager comprising:

a first cable manager having guides for the conductors, said first cable manager having a cable side adjacent the cable and having a connector side with electrical contacts, said first cable manager having first and second sides extending between cable side and said connector side, said first and second sides being on substantially opposite sides of said first cable manager, said first cable manager having a plurality of guides for the conductors, said guides uniquely defining guidance of the conductors from said cable side to said connector side, said guides routing a first conductor pair from said first side at said cable side to a connecting plane at said connector side, said guides routing a second conductor pair from said second side at said cable side to said connecting plane at said connector side, said connecting plane being arranged closer to said first side than said second side;

a second cable manager having guides for conductors, said second cable manager having a cable side adjacent the cable and having a connector side with electrical contacts, said second cable manager having first and second sides extending between cable side and said connector side, said first and second sides being on substantially opposite sides of said second cable manager, said second cable manager having a plurality of guides for the conductors, said guides uniquely defining guidance of the conductors from said cable side to said connector side, said guides routing said first conductor pair from said second side at said cable side to a connecting plane at said connector side, said guides routing said second conductor pair routed from said first side at said cable side to said connecting plane at said connector side, said connecting plane of said second cable manager being arranged closer to said first side than said second side of said second cable manger.

19. An arrangement in accordance with claim 18, wherein:

said guides of said first and second cable mangers are arranged to minimize tolerances in crosstalk at said first and second cable managers.

20. An arrangement in accordance with claim 18, wherein:

the cable is connected to said cable side of said first and second cable mangers, the cable having the plurality of conductors in a first arrangement at said first cable manger, and the cable having the plurality of conductors in a second arrangement at said second cable manger.

21. An arrangement in accordance with claim 20, wherein:

positions of the first and second conductor pairs in said first arrangement are reversed from positions of the first and second pairs of the conductors in said second arrangement.

*22. A connecting cable, comprising:*

*a) a cable having a first end and a second end, the cable including a plurality of conductor pairs;*

*b) a first cable manager attached to the first end of the cable, the first cable manager defining a first conductor arrangement including:*

*i) outer guides located at opposite sides of the first cable manager, two outer conductor pairs of the plurality of conductor pairs of the cable being routed within the outer guides;*

*ii) top guide structure at least partially formed in a top surface of the first cable manager; and*

*iii) bottom guide structure at least partially formed in a bottom surface of the first cable manager;*

*iv) wherein a first inner conductor pair of the plurality of conductor pairs is routed within the top guide structure and extends from a rearward end of the first cable manager to an opposite forward end, and wherein a second inner conductor pair of the plurality of conductor pairs is routed within the bottom conductor guide and extends from the rearward end of the first cable manager to the opposite forward end, without crossing;*

*c) a second cable manager attached to the second end of the cable, the second cable manager defining a second conductor arrangement including:*

*i) outer guides located at opposite sides of the second cable manager, the two outer conductor pairs of the plurality of conductor pairs of the cable being routed within the outer guides;*

*ii) top guide structure at least partially formed in a top surface of the second cable manager; and*

*iii) bottom guide structure at least partially formed in a bottom surface of the second cable manager;*

*iv) wherein the second inner conductor pair of the plurality of conductor pairs is routed within the top guide structure and extends from a rearward end of the second cable manager to an opposite forward end, and wherein the first inner conductor pair of the plurality of conductor pairs is routed within the bottom conductor guide and extends from the rearward end of the second cable manager to the opposite forward end, without crossing; and*

*d) electrical plug connections arranged at both the first and second ends of the cable.*

*23. The connecting cable as claimed in claim 22, wherein each of the top guide structure of the first cable manager and the bottom guide structure of the second cable manager is V-shaped.*

*24. The connecting cable as claimed in claim 22, wherein the connecting cable is a patch-cord cable.*

*25. The connecting cable as claimed in claim 22, wherein the conductor arrangement of the first cable manager is different than the conductor arrangement of the second cable manager.*

*26. The connecting cable as claimed in claim 25, wherein the first and second cable managers are configured to latch into the electrical plug connections.*

*27. The connecting cable as claimed in claim 22, wherein the first inner conductor pair and the second inner conductor pair are routed into a common connecting plane at the forward end of the first cable manager.*

*28. The connecting cable as claimed in claim 27, wherein the common connecting plane of the first cable manager is a first connecting plane, and wherein the two outer conductor pairs are routed into a second connecting plane offset from the first connecting plane.*

*29. The connecting cable as claimed in claim 27, wherein the first inner conductor pair and the second inner conductor pair are routed into a common connecting plane at the forward end of the second cable manager.*

*30. The connecting cable as claimed in claim 29, wherein each of the bottom guide structure of the first cable manager and the top guide structure of the second cable manager lies in the common connecting plane of the respective first and second cable managers.*

*31. A connecting cable, comprising:*

*a) a cable having a first end and a second end, the cable including a plurality of conductor pairs, the cable including a first conductor routing arrangement at the first end of the cable and a second conductor routing arrangement at the second end of the cable;*

*b) wherein the first conductor routing arrangement is at least partially defined by a first cable manager, the first conductor routing arrangement including:*

*i) two outer conductor pairs of the plurality of conductor pairs routed within outer guides located at opposite sides of the first cable manager;*

*ii) a first inner conductor pair of the plurality of conductor pairs routed within a top conductor guide of the first cable manager; and*

*iii) a second inner conductor pair of the plurality of conductor pairs routed within a bottom conductor guide of the first cable manager;*

*iv) wherein the first inner conductor pair extends from a rearward end of the first cable manager to an opposite forward end, and the second inner conductor pair extends from the rearward end of the first cable manager to the opposite forward end, without crossing;*

*c) and wherein the second conductor routing arrangement is at least partially defined by a second cable manager, the second conductor routing arrangement including:*

*i) the two outer conductor pairs of the plurality of conductor pairs routed within outer guides located at opposite sides of the second cable manager;*

*ii) the first inner conductor pair of the plurality of conductor pairs routed within a bottom conductor guide of the second cable manager; and*

*iii) the second inner conductor pair of the plurality of conductor pairs routed within a top conductor guide of the second cable manager;*

*iv) wherein the first inner conductor pair extends from a rearward end of the second cable manager to an opposite forward end, and the second inner conductor pair extends from the rearward end of the second cable manager to the opposite forward end, without crossing.*

*32. The connecting cable as claimed in claim 31, wherein each of the first inner conductor pair at the first end of the cable and the second inner conductor pair at the second end of the cable is routed in a V-shape configuration within the respective first and second cable managers.*

*33. The connecting cable as claimed in claim 31, wherein the connecting cable is a patch-cord cable.*

*34. The connecting cable as claimed in claim 31, wherein the first cable manager that at least partially defines the first conductor routing arrangement is different than the second cable manager that at least partially defines the second conductor routing arrangement.*

*35. The connecting cable as claimed in claim 31, wherein the first inner conductor pair and the second inner conductor pair are routed into a common connecting plane at the first end of the cable.*

*36. The connecting cable as claimed in claim 35, wherein the common connecting plane at the first end of the cable is a first connecting plane, and wherein the two outer conductor pairs are routed into a second connecting plane offset from the first connecting plane at the first end of the cable.*

*37. The connecting cable as claimed in claim 35, wherein the first inner conductor pair and the second inner conductor pair are routed into a common connecting plane at the second end of the cable.*

*38. The connecting cable as claimed in claim 37, wherein the second inner conductor pair lies in the common connecting plane at the first end of the cable, and wherein the first inner conductor pair lies in the common connecting plane at the second end of the cable.*

* * * * *

UNITED STATES PATENT AND TRADEMARK OFFICE

CERTIFICATE OF CORRECTION

PATENT NO. : RE 41,206 E
APPLICATION NO. : 11/525191
DATED : April 6, 2010
INVENTOR(S) : Gwiazdowski et al.

It is certified that error appears in the above-identified patent and that said Letters Patent is hereby corrected as shown below:

On the title page please change item (22) PCT Filed thru Related U.S. Patent Documents item (64) to read as follows:

(22) Filed.: Sep. 21, 2006

Related U.S. Patent Document

Reissue of:
(64) Patent No.: 6,793,515
Issued: Sep. 21, 2004
Appl. No.: 10/149,280
PCT Filed: Nov. 16, 2000
PCT No.: PCT/EP00/11348
§371 (c)(1),
(2), (4) Date: Jun. 6, 2002
PCT Pub. No.: WO01/43239
PCT Pub. Date: Jun. 14, 2001

Signed and Sealed this

Sixth Day of July, 2010

David J. Kappos

David J. Kappos
*Director of the United States Patent and Trademark Office*